United States Patent Office 3,526,460
Patented Sept. 1, 1970

3,526,460
OPTICAL CHARACTERISTICS MEASURING
APPARATUS
James E. Webb, Administrator of the National Aeronautics and Space Administration, with respect to an invention of Charles Ernest Gray, Pasadena, Calif.
Filed June 27, 1967, Ser. No. 649,360
Int. Cl. G01n 1/00, 21/00, 33/28
U.S. Cl. 356—36                                    4 Claims

ABSTRACT OF THE DISCLOSURE

An apparatus for measuring the effect of outgassing material in vacuum on the optical characteristics of optical elements. The apparatus includes a source of light providing a beam partially directed to a first photocell to monitor changes in the light from the source. The rest of the light beam is directed to a second photocell through optical elements whose optical characteristics as affected by outgassing material is to be measured. The optical elements and the material are included in a chamber which can be evacuated. The vacuum in the chamber causes the material to outgas which results in condensation of molecules on the optical elements, affecting their light transmission or light reflectance characteristics. The changes in such optical properties are measured as a function of changes in the output of the second photocell.

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

Field of the invention

This invention relates to optical characteristics measuring instruments, and more particularly, to a method and an apparatus, finding particular application in measuring characteristics of optical elements located adjacent to materials which tend to outgas in a space environment.

Description of the prior art

The near vacuum environment of space and crammed quarters of present spacecraft, and those to be built in the foreseeable future, present unique instrument-design problems. These include crossfeeding, representing the effect of one instrument on adjacently located instruments and the effect of a vacuum environment on each of the instruments and those near it. For example, many materials used in space instrumentation, tend to outgas in a vacuum environment, that is, molecules at the surface of such materials leave the materials and tend to condense on adjacent surfaces. The condensation of the molecules may greatly affect adjacent optical equipment, such as a television camera or other instruments which include radiant-energy transmitting and/or reflecting optical elements. Thus, it is very important to determine, prior to the actual flight, the outgassing behavior of certain materials and their effect on the optical characteristic of adjacent elements, so that the data received during the flight can be properly evaluated. Also, since different materials outgas at different rates, it is desirable to be able to accurately determine the outgassing characteristics of each material and its effect on adjacent optical elements.

OBJECTS AND SUMMARY OF THE INVENTION

Accordingly, it is a primary object of this invention to provide an apparatus which is particularly useful to determine optical characteristics of elements in a vacuum environment.

Another object of this invention is to provide an apparatus for measuring the effect of outgassing materials in a vacuum environment on the transmission characteristics of adjacently located optical elements.

Still a further object of the present invention is to provide an apparatus for continuously measuring the effect of outgassing material in a vacuum environment on the reflectance characteristics of optical elements adjacent thereto.

Still a further object of this invention is to provide an apparatus in which the transmission and/or reflectance characteristics of optical elements located adjacent to an outgassing material is continuously monitored and accurately determined, irrespective of changes in the source of radiant energy.

Still a further object of the present invention is to provide an apparatus in which energy of a selected frequency is employed to measure the transmission and/or reflectance characteristics of optical elements subjected to a simulated space environment which includes outgassing materials.

These and other objects of the invention are achieved by providing an apparatus in which a single source of light is split into two beams directed along two diverging paths. A light along one path is directed to a first photocell, through light transmitting optical windows and/or reflecting surfaces in a vacuum chamber. The chamber which is connected to a vacuum pump to produce a vacuum therein, so as to simulate a space environment, is large enough to accommodate materials which outgas in vacuum. The output signal from the first photocell provides a measure of the transmission and/or reflectance characteristics of the optical surfaces as they are affected by the molecules of the outgassing material condensing on the surfaces.

A second photocell, positioned along the second light path, provides a reference output signal, which after aligning the apparatus is only affected by changes in the intensity of the light from the light source. Thus, the output of the second photocell is used to monitor changes in the light source.

In the absence of outgassing by a material in the vacuum chamber, the transmission of light through or the reflectance from the optical elements is not affected. However, when outgassing occurs, due to a vacuum environment in the chamber, molecules of the material condense on the windows, and thereby reduce the transmissivity of light therethrough or the reflectance of light therefrom. Consequently, the output of the first photocell is reduced. The amount by which the output is reduced is indicative of the transmission loss through or the loss of reflectance from the optical elements, due to the outgassing material. The outputs of both photocells are supplied to a recorder, such as a strip-chart recorder. Thus, by monitoring the output of the photocells over a period of time, the effect of the outgassing material on the optical elements during such period is easily obtained.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
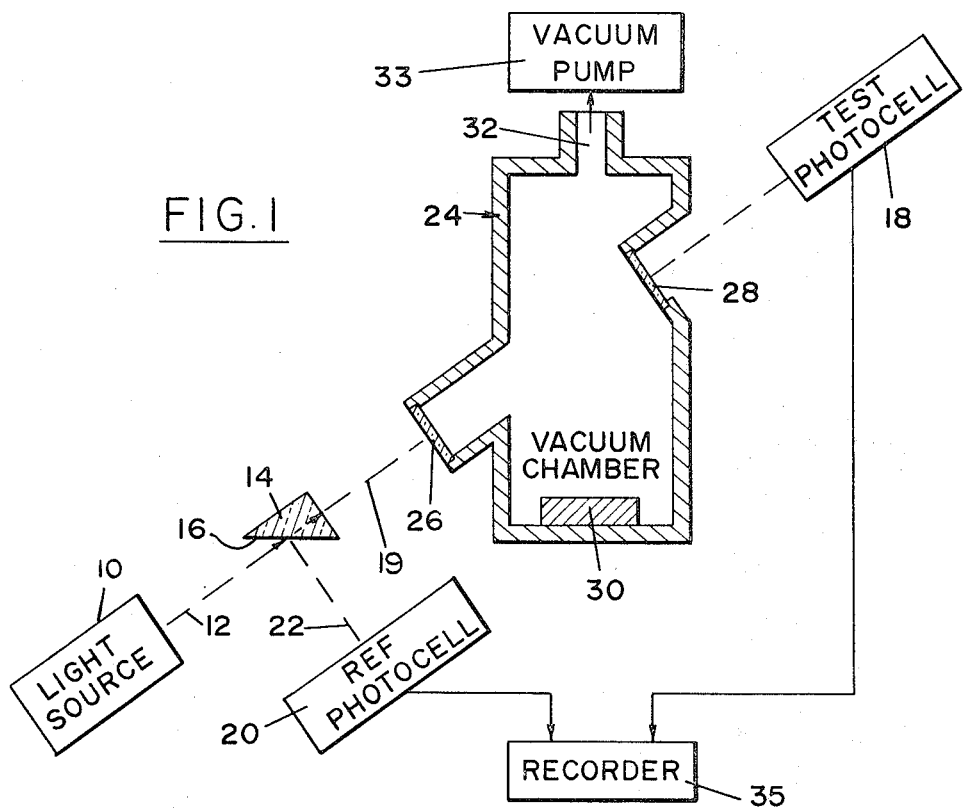
FIG. 1 is a combination block and cross-section diagram of one embodiment of the invention.

Reference is now made to FIG. 1 which is a simplified block and cross-sectional view of one, exemplary embodiment of the invention. The apparatus of the invention includes a light source 10, providing a beam of light directed along dashed line 12 to a beam splitter, shown as a prism 14. Surface 16 of prism 14 is coated so that a portion of the light from source 10 is directed to a test photocell 18 along a direction indicated by line 19. The rest of the light of the beam from source 10 is reflected by surface 16 toward a reference photocell 20 along a direction indicated by dashed line 22.

Interposed between prism 14 and test photocell 18 is a vacuum chamber 24, which includes light-transmitting windows 26 and 28 mounted on opposite walls of the chamber. Vacuum-tight seals (not shown) are used in mounting the windows to the walls. The chamber is positioned so that the light from the prism 14 passes through the two windows to the test photocell. The chamber which is large enough to accommodate a material 30 which outgasses in vacuum, has an opening 32 connectable to a vacuum pump 33 or any other known device, designed to produce a vacuum in the chamber in order to simulate a space environment therein. Preferably the shape of the chamber 24 and the manner in which the windows are mounted are chosen so that one window, such as 28 is directly in the path of the outgassed particles, while the other window is shielded somewhat even from particles randomly moving in the chamber in hard vacuum.

The outputs of the two photocells 18 and 20 are supplied to a recorder 35, such as a strip chart recorder. Its function is to continuously monitor the outputs of the two photocells to provide a comparison therebetween. In practice, the prism 14 is positioned so that fixed known portions of the light from light source 10 are directed to the photocells 18 and 20. Consequently, the ratio of the outputs thereof is known. This ratio remains constant, irrespective of changes in the actual light supplied by source 10. For example, if half the light from source 10 is directed to each of the photocells, the cells will produce equal outputs so that the ratio between them is one. This ratio will remain one, irrespective of changes in the light from source 10, since such changes will equally affect the outputs of both cells.

The source 10 is chosen to emit radiation at the specific frequencies of interest to the objective of the particular space experiment. Thus for example, if an optical instrument on the spacecraft were designed to measure ultraviolet radiation, then the light source 10 would be ultraviolet source. On the other hand, if a television camera on the spacecraft is to be in the vicinity of a material which outgasses, then the source 10 will consist of a source of visible light. The photocells are chosen to match the frequency spectrum emitted by source 10.

As previously stated, in the absence of changes in the transmission characteristics of windows 26 and 28, the ratio of their outputs supplied to recorder 35 is constant. To test the effect of the outgassing material on the transmission characteristics of window 28, assumed to be the only one affected by material outgassing, an evacuation process is initiated by evacuating chamber 24. As the evacuation progresses, material 30 begins to outgas, that is, molecules begin to leave its surface and be drawn towards opening 32. Some of the molecules condense on the interior surface of window 28, thereby affecting the transmission characteristic thereof. That is, the molecules which condense on the window reduce the transmission of radiant energy therethrough. The reduction or loss in transmission is evidenced by a decrease in the output of test photocell 18. Thus, any variation from the established ratio of the two outputs is directly related to the transmission loss through the window 28.

By continuously monitoring the outputs of the two photocells, the continuous outgassing effect of material 30 in the chamber on the transmission characteristics of window 28 can be studied. This is particularly desirable, since materials outgas at different rates, which are not necessarily linear. In some instances most of the outgassing is consummated in the first few hours, perhaps even within the first one-half hour in a vacuum chamber. Thereafter, the rate of outgassing may be almost imperceptible. This would be evidenced by a sharp early loss in transmission through the windows followed by a more or less constant low rate of transmission. This suggests a possibility of preconditioning certain materials in a vacuum in the laboratory for a length of time necessary to consummate most of the outgassing and then use the degassed material in the spacecraft. Thus, by utilizing the apparatus of the present invention, the outgassing characteristics of different materials can be conveniently studied to determine which materials exhibit minimum outgassing and/or how certain materials should be outgassed in the laboratory prior to their use in the spacecraft, so as to minimize their outgassing during the flight, of materials which would subsequently condense adjacent optical elements.

Figure 2:
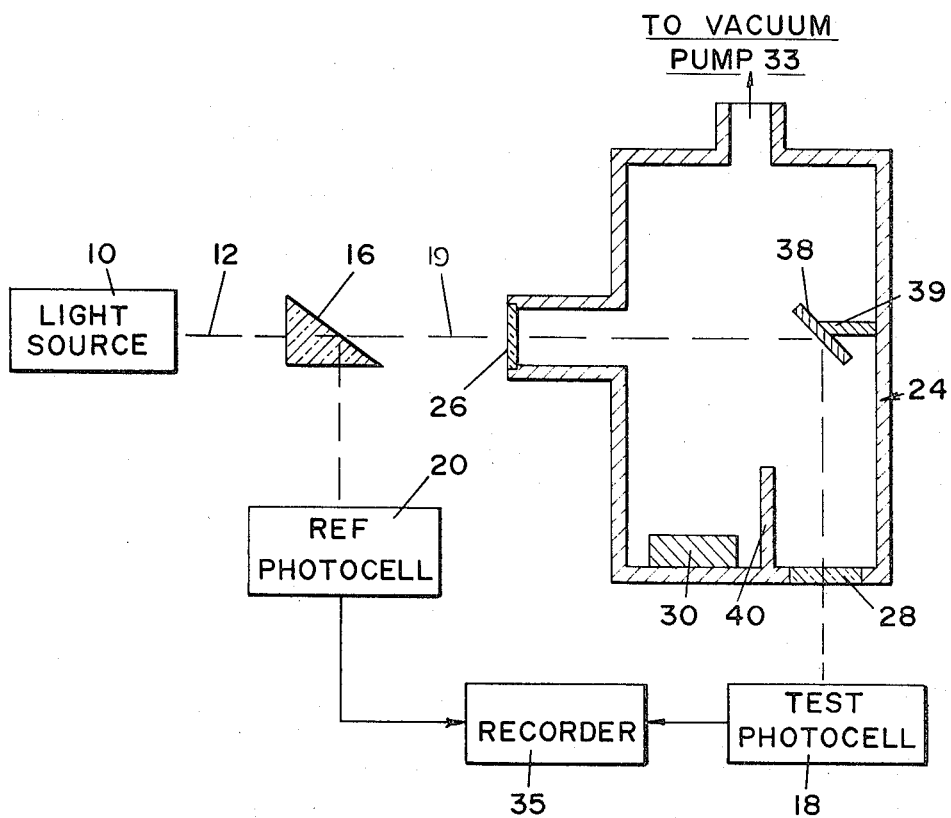
FIG. 2 is a diagram of another embodiment of the invention.

The apparatus of the present invention is not intended to be limited to measuring the transmission loss of optical elements as a result of the outgassing of material in vacuum. Rather, by modifying the shape of the chamber 24 and including therein a reflecting optical element or mirror, loss of reflectance from such a mirror due to the outgassing of material 30 may be conveniently studied. An exemplary embodiment of chamber 24 for measuring reflectance losses is diagrammed in FIG. 2 to which reference is made herein. In FIG. 2, elements like those described in conjunction with FIG. 1 are designated by like numerals.

Light enters the vacuum chamber 24 through window 26 and exits from the chamber toward the test photocell 18 through window 28. In addition however, a reflecting element such as a mirror 38 is mounted by means of a bracket 39 in the interior of chamber 24. Mirror 38 is mounted so that light directed thereto through window 26 is reflected by it to the test photocell 18 through window 28. Preferably, windows 26 and 28 are protected from being affected by the outgassing of material 30. This is desirable to insure that any changes in the output of photocell 18 are due to reflectance losses of mirror 38, rather than to transmission losses through windows 26 and 28. This may be accomplished by providing chamber 24 with a baffle 40 which separates window 28 from material 30. Also, window 26 may be mounted at the end of a tube-like extension of chamber 24 in order to minimize the condensation of molecules on the interior surface thereof.

In some applications, in addition to producing a vacuum in chamber 24, it may be desirable to control the temperature of the optical element on which the molecules condense and/or the temperature of the outgassing material 30. It is appreciated that by cooling the optical element more molecules would tend to condense thereon, while raising the temperature of the material 30 would increase the outgassing process. Various cooling or heating techniques may be employed to accomplish such ends.

Figure 3:
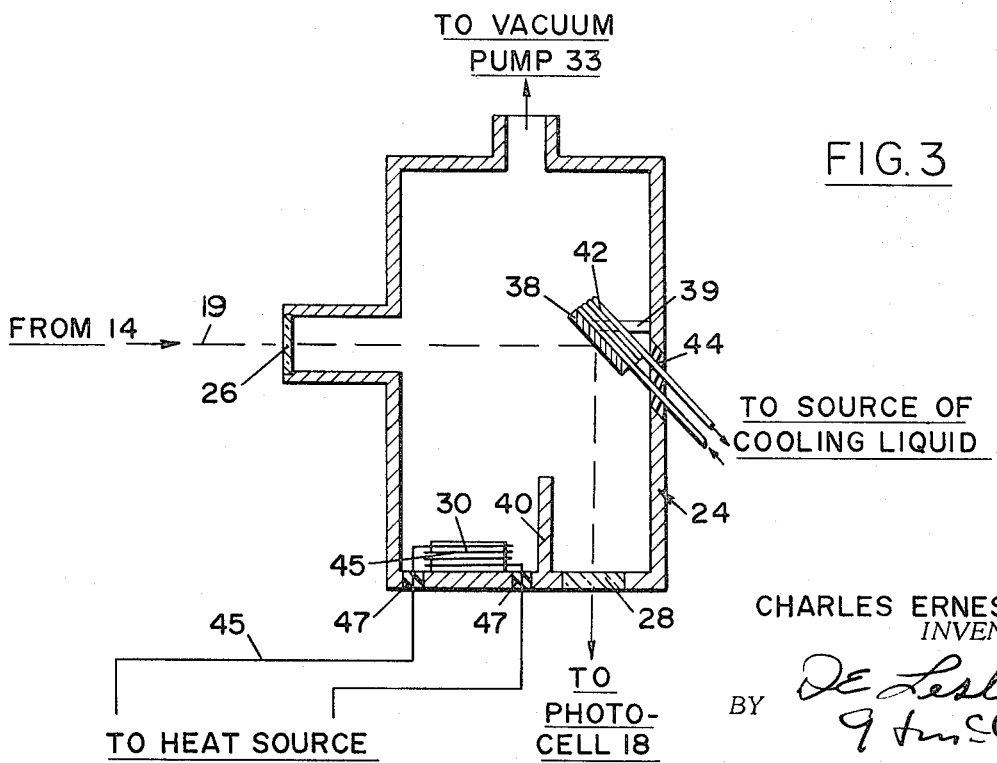
FIG. 3 is a partial diagram of still another embodiment of the invention.

However, for exemplary purposes, in FIG. 3 the chamber arrangement shown in FIG. 2 is again diagrammed with the addition of conduit 42 shown wound about mirror 38 and extending to the exterior of the chamber through vacuum seals 44. The conduit is assumed to be connected to a source of cooling liquid (not shown) which causes the liquid to flow through the conduit to adjust the temperature of the mirror 38. Similarly a heating coil 45 wound about material 30 is shown extending to the exterior of the chamber through hermetic thermally insulating seals 47.

There has accordingly been shown and described herein a novel apparatus for measuring the effect of outgassing material in a vacuum environment on the radiant energy transmission and/or reflectance characteristics of optical elements positioned adjacent to such material. The measurements are accomplished by providing a single source of light which is split into two diverging beams. One of the beams is used to provide a reference output signal by means of which any changes in the output of the single light source may be determined. The other beam is directed to a test photocell through optical elements in an evacuable chamber in which a material whose outgassing effect on the optical elements is to be determined.

It should be appreciated, that those familiar with the art in light of the teachings herein disclosed, may make modifications and/or substitute equivalents in the arrangements as shown without departing from the scope of the invention. Therefore, all such modifications and/or equivalents are deemed to fall within the scope of the invention as claimed in the appended claims.

What is claimed is:

1. The method of determining the effect of gas molecules of a material which outgasses in vacuum on the optical characteristics of an adjacently located optical member, the steps comprising:

directing one part of a beam of radiant energy along a first path in a first direction as a test beam and a second part along a second path in a second direction as a reference beam;

placing an evacuable chamber in said first path, said chamber including optical members which enable said test beam to be transmitted into said chamber and therefrom;

positioning a test sample material which outgasses in vacuum in said chamber;

locating at least one of said optical members in said chamber with a single surface both in said first path and exposed to be affected by gas molecules outgassed by said test sample material;

evacuating said chamber; and measuring and comparing the radiant energy in said second path and the radiant energy transmitted from said chamber as an indication of the effect of outgassed gas molecules on the optical characteristics of said at least one of said optical members.

2. The method as recited in claim 1 wherein the placing step comprises placing said chamber so that said at least one of said optical members transmits said energy therethrough, with the transmissivity through said at least one of said optical members being a function of the gas molecules on the surface thereof.

3. The method as recited in claim 1 wherein the placing step comprises placing said chamber so that the surface of said at least one of said optical members reflects the energy directed thereto, with the reflectance being a function of the gas molecules which are on said surface.

4. The method as recited in claim 1 further including the step of controlling the relative temperatures of said outgassing material and said at least one of said optical members.

References Cited

UNITED STATES PATENTS

| | | | |
|---|---|---|---|
| 2,408,614 | 10/1946 | Dimmick | 118—49 |
| 2,427,013 | 9/1947 | MacAdams | 356—206 |
| 2,428,868 | 10/1947 | Dimmick | 118—49 |
| 2,878,388 | 3/1959 | Bergson | 356—206 X |
| 3,059,611 | 10/1962 | Fury et al. | 118—49 X |
| 3,063,867 | 11/1962 | Emery | 118—49 X |
| 3,416,865 | 12/1968 | Townsend | 356—206 |

RONALD L. WILBERT, Primary Examiner

W. A. SKLAR, Assistant Examiner

U.S. Cl. X.R.

118—9, 49.5; 250—218; 356—38, 104, 204, 206